(12) United States Patent
Bayliss (10) Patent No.: US 12,306,889 B2
(45) Date of Patent: May 20, 2025

(54) SYSTEM AND METHOD FOR ASSESSING TRUTHFULNESS IN MEDIA CONTENT

(71) Applicant: Morgan Bayliss, Orleans (CA)

(72) Inventor: Morgan Bayliss, Orleans (CA)

( * ) Notice: Subject to any disclaimer, the term of this patent is extended or adjusted under 35 U.S.C. 154(b) by 63 days.

(21) Appl. No.: 17/449,614

(22) Filed: Sep. 30, 2021

(65) Prior Publication Data

US 2022/0121720 A1   Apr. 21, 2022

Related U.S. Application Data

(60) Provisional application No. 63/094,560, filed on Oct. 21, 2020.

(51) Int. Cl.
*G06F 16/00* (2019.01)
*G06F 16/9536* (2019.01)
*G06F 16/954* (2019.01)
*G06F 16/957* (2019.01)
*G06F 16/958* (2019.01)

(52) U.S. Cl.
CPC ........ *G06F 16/9536* (2019.01); *G06F 16/954* (2019.01); *G06F 16/9577* (2019.01); *G06F 16/958* (2019.01)

(58) Field of Classification Search
CPC .............. G06F 16/9536; G06F 16/958; G06F 16/9577; G06F 16/954
See application file for complete search history.

(56) References Cited

U.S. PATENT DOCUMENTS

| 8,554,601 B1 * | 10/2013 | Marsh ................ G06Q 30/0278 705/7.32 |
| 9,015,037 B2 | 4/2015 | Myslinski |
| 9,342,851 B2 | 5/2016 | Musil |
| 9,536,266 B2 | 1/2017 | Ploesser et al. |

(Continued)

FOREIGN PATENT DOCUMENTS

| KR | 20190107832 | 9/2019 |
| KR | 20200045657 | 5/2020 |

(Continued)

OTHER PUBLICATIONS

Flamini, Daniela, "Can media literacy be gamified? A Q&A with one of Fakey's developers", https://www.poynter.org/fact-checking/2019/can-media-literacy-be-gamified-a-qa-with-one-of-fakeys-developers/, dated Jul. 26, 2019, printed Jul. 29, 2020, 7 pages.

(Continued)

*Primary Examiner* — Alex Gofman
*Assistant Examiner* — Suman Rajaputra
(74) *Attorney, Agent, or Firm* — Brion Raffoul (57) ABSTRACT

Systems and methods useful in assessing a truthfulness of media content. A user interface provides a media content feed to a user. The user assesses the truthfulness of one or more pieces of media content in the feed and provides feedback relating to the truthfulness or falsity of the media content. The aggregated feedback, along with reputational scores for organization sources and/or authors of the media content are used to determine a truth rating for each piece of media content. The placement of each piece of media content is dependent on the truth rating of that specific piece of media content as well as the truth rating of the other pieces of media content in the feed.

8 Claims, 5 Drawing Sheets

(56) References Cited

U.S. PATENT DOCUMENTS

| | | | |
|---|---|---|---|
| 10,229,219 B2 | 3/2019 | Owens et al. | |
| 10,614,469 B1 | 4/2020 | Lepeska et al. | |
| 11,113,981 B2* | 9/2021 | Kurjanowicz | G09B 5/02 |
| 2009/0157667 A1* | 6/2009 | Brougher | G06F 16/25 |
| | | | 707/999.005 |
| 2012/0110072 A1* | 5/2012 | de Villiers | G06Q 10/10 |
| | | | 709/204 |
| 2014/0013241 A1 | 1/2014 | Brown et al. | |
| 2014/0156996 A1* | 6/2014 | Heppe | G06Q 30/00 |
| | | | 713/168 |
| 2016/0104178 A1* | 4/2016 | Stockham | H04W 4/021 |
| | | | 705/7.29 |
| 2017/0039879 A1* | 2/2017 | Dasgupta | G09B 19/00 |
| 2017/0206271 A1* | 7/2017 | Jain | G06F 16/3344 |
| 2018/0196815 A1 | 7/2018 | Vadrevu et al. | |
| 2018/0239832 A1* | 8/2018 | Galuten | G06F 16/248 |
| 2019/0082224 A1 | 3/2019 | Bradley et al. | |
| 2019/0146965 A1 | 5/2019 | Zack | |
| 2019/0179861 A1 | 6/2019 | Goldenstein et al. | |
| 2019/0258828 A1* | 8/2019 | Rice | G06F 21/602 |
| 2020/0202071 A1* | 6/2020 | Ghulati | G06Q 50/01 |
| 2020/0202073 A1* | 6/2020 | Ghulati | G06F 40/279 |
| 2021/0117417 A1* | 4/2021 | Hendrickson | G06F 16/90 |

FOREIGN PATENT DOCUMENTS

| | | |
|---|---|---|
| TW | 201931160 | 8/2019 |
| WO | 2019175571 | 9/2019 |
| WO | 2020061578 | 3/2020 |

OTHER PUBLICATIONS

Get Smart About News, copyright 2020, The News Literacy Project, Washington, DC, USA, 7 pages.
Reddit.com post, Holocaust survivors urge Facebook to remove denial posts, undated, 1 page.
What Science Says About Children, COVID-19 and School Reopenings, Website, copyright 2020, FactCheck.org—A Project of The Annenberg Public Policy Center, 12 pages.
Climate Feedback—A Scientific Reference to Reliable Information on Climate Change, Website, https://climatefeedback.org, printed Jul. 29, 2020, 8 pages.

* cited by examiner

SYSTEM AND METHOD FOR ASSESSING TRUTHFULNESS IN MEDIA CONTENT

RELATED APPLICATIONS

This application is a non-provisional patent application which claims the benefit of U.S. provisional application No. 63/094,560 filed on Oct. 21, 2020.

TECHNICAL FIELD

The present invention relates to online media. More specifically, the present invention relates to a system and method for promoting accuracy in online media via fact-checking.

BACKGROUND

As is well known, disinformation and misinformation is a significant problem in modern society. In particular, misleading news and other media that is shared online is highly detrimental to a functioning public sphere. The algorithms that power many online media aggregators, social media, etc. prioritize dramatic and attention-grabbing media pieces, sometimes at the expense of accuracy.

Although some websites and platforms (e.g., Twitter®) are attempting to combat "fake news", such top-down fact-checking has several drawbacks. For one thing, few individual fact-checkers are able to keep up with the constant flow of information. Often, by the time a source has been debunked, a considerable number of user views have already been completed and the false information has been entered into the mainstream dialogue. As another issue, many readers/viewers suspect authoritative opinions to be politically motivated. Further, fact-checking can be time-consuming and resource-intensive, and tends to ultimately fall on individual readers/users. Accordingly, there is a need for a platform that prioritizes accuracy and fosters a collaborative, bottom-up fact-checking community, without placing undue burden on the reader.

SUMMARY

The present invention relates to systems and methods useful in assessing a truthfulness of media content. A user interface provides a media content feed to a user. The user assesses the truthfulness of one or more pieces of media content in the feed and provides feedback relating to the truthfulness or falsity of the media content. The aggregated feedback, along with reputational scores for organization sources and/or authors of the media content are used to determine a truth rating for each piece of media content. The placement of each piece of media content is dependent on the truth rating of that specific piece of media content as well as the truth rating of the other pieces of media content in the feed.

In a first aspect, this document discloses a system for promoting user assessed truthfulness in media content, the system comprising:
 a server for communicating with at least one user device, the server comprising:
 a user interface module for displaying said media content to at least one user via said user device,
 wherein truth ratings of said media content are applied by said at least one user via said interface, and wherein each of said truth ratings is based on an assessment of said at least one user of a factualness of said media content;
 and wherein a display order of said media content on said display interface is based on said truth ratings, such that media content with a higher truth rating is displayed before media content with a lower truth rating.

BRIEF DESCRIPTION OF THE DRAWINGS

The present invention will now be described by reference to the following figures, in which identical reference numerals refer to identical elements and in which.

DETAILED DESCRIPTION

In one aspect of the present invention, there is provided systems and methods for managing and assessing the truthfulness of media content. In one aspect, the system provides users with an interface through which a feed of media content is provided. On this interface, each piece of media content is associated with a truth rating. Each piece of media content is placed in the feed based on its truth rating such that media content with a higher truth rating is placed higher on the feed than pieces of media content with a lower truth rating.

The various pieces of media content in the feed are moderated by verification users whose task is to determine the veracity or truthfulness of each piece of media content. Based on the feedback of verification users regarding a specific piece of media content, as well as on factors such as the reputation score of the organization that provided that piece of media content, the truth rating of the media content is computed. Feedback from general users of the system are also taken into account when determining the truth rating of each piece of media content.

Using the interface, a user can indicate whether a piece of media content is, according to the user's assessment, truthful or not. If the user considers a piece of media content to be truthful, then the user's input regarding the rating increases that piece of media content truth rating. If, however, the user considers the piece of media content to not be truthful, then the user's input would serve to decrease the truth rating of that piece of media content. In one implementation, a user upvotes a piece of media content if the content is considered truthful while the piece of media content is downvoted if the content is considered false or untruthful. As will be explained below, the aggregate of votes, in combination with the reputation scores of the organization and/or the author, serves as the truth rating of the piece of media content.

It should, however, be clear that the truth rating of a piece of media content is not solely dependent on the input of the users of the system. Specific users of the system, termed as verification users in this document, are tasked with assessing the veracity or truthfulness of a piece of media content. These verification users operate to moderate the pieces of media content that have been submitted to the system. Each verification user works to assess or verify whether a piece of media content is truthful or not. Once an assessment is complete, each verification user can provide feedback as to that verification user's findings regarding the truthfulness or falsity of that piece of media content. Verification users can also provide comments for each piece of media content.

These comments regarding the veracity of the piece of media content can be viewed by all users of the system. However, comments from verification users are placed higher or rank higher than comments from general users of the system.

It should also be clear that general users of the system may become verification users. To transition from general users within the system into verification users, a general user is provided with online training regarding online fact-checking. Once a general user has completed a requisite number of online courses or modules (provided by the system), the general user is transitioned into a verification user. As noted above, verification users have higher privileges in the system and higher responsibilities than the general user. A verification user's opinion regarding the veracity of a piece of media content is more valued and carries more weight with respect to the truth rating of a piece of media content as opposed to the opinion of a general user. In addition, comments by a verification user regarding a piece of media content are placed in a more visible position when compared to the comments of a general user.

As noted above, a piece of media content's truth rating may also take into account a reputation score by the organization providing a piece of media content. An organization's reputation score is, in one aspect of the invention, based on the number of pieces of media content provided by the organization to the system and how many of these pieces of media content have been considered to be truthful by verification users of the system. In addition to how many of these pieces of media content have been submitted by the organization, the number of these pieces that have been considered untruthful by the verification users is also taken into account when calculating an organization's reputation score. Thus, an organization's reputation score is a combination of the number of pieces submitted by the organization, how many of these pieces have been considered truthful by the systems verification users, and how many of these pieces have been considered untruthful by the verification users. Accordingly, an organization is given incentive to provide more articles to the system as well as to provide more truthful articles so as to increase that organization's reputation score.

In addition to feedback from users of the system and the reputation score of the organization providing a piece of media content, the truth rating of a specific piece of media content may also take into account the reputation score of a journalist/reporter/author associated with the piece of media content. Similar to the reputation score of an organization, the reputation score of an author or journalist associated with a piece of media content is calculated based on the number of pieces of media content submitted by that author or journalist as well as the number of those pieces of media content that have been considered truthful or untruthful by the system's verification users. Because of the above, the truth rating of a piece of media content may continuously be adjusted as the reputation score of its associated organization and/or author/journalist changes. Thus, as an organization or an author's reputation score increases, the truth rating of associated pieces of media content may also increase. This allows the part output of an organization or author to be seen in better light as that organization or author's reputation for truthfulness improves. However, should an organization or author's reputation diminish due to the submission of untruthful or problematic media content, the past output of that organization or author will, similarly, be seen in worse light.

It should be clear from the above that a verification user for the system has a large amount of influence on the truth rating of a piece of media content. Not only do verification users contribute to the truth rating for a piece of media content, the verification user's opinions on multiple pieces of media content are taken into account when calculating an organization's reputation score as well as the reputation score of an author or journalist. As well, it should be clear that, in one implementation, a general user's opinions or findings do not enter into the calculations for a reputation score of either an organization or a journalist or author.

To assist in the determination of the veracity of a piece of media content, organizations and/or authors or journalists may provide supporting documentation for a specific submission. As an example, if the piece of media content is a news article, an organization or an author may provide documentation or links to resources that support or prove the veracity of the allegations made in the article. By submitting supporting documentation, an organization or an author will help in the verification user's job of assessing the veracity of a piece of media content. It should be clear that general users are not able to access the supporting documentation provided by organizations or authors for a piece of media content. Such documentation is only available to verification users as it is the main responsibility of the verification users to establish the veracity of that piece of media content. A verification user may, of course, refer to the supporting documentation in his or her comments regarding a piece of media content. Since a verification user's comments regarding a piece of media content are available to all users of the system, general users can thus be made aware of the existence of such supporting documentation.

It should be clear that the ability to provide supporting documentation for a piece of media content gives to the organization or author an opportunity to increase its reputation score. By providing supporting documentation, an organization or author may increase the chances that a verification user will find the specific piece of media content to be truthful. Such a result would, of course, increase the organization or author's reputation score. As can be imagined, a high reputation score for an organization or an author can serve to increase the truth rating of their media content. A high truth rating will have the effect of greater visibility for the media content.

When a piece of media content is submitted to the system by an organization and/or an author, that piece of media content is initially provided with a neutral truth rating. This neutral truth rating ensures that the submitted piece of media content is not provided with bias regarding its veracity when viewed by users of the system. General users can view the piece of media content and provide their feedback regarding the veracity of the submitted piece of media content. This feedback, in addition to any reputation scores, can then be used to calculate the truth rating of the submitted piece of media content. After the submitted piece of media content has been provided to the general users, verification users can assess the veracity of that submitted piece of media content using whatever means maybe at their disposal as well as any supporting documentation that may have been provided. The feedback from the verification users and their assessment can then be used to adjust the truth rating of that submitted piece of media content.

To assist in the free flow of ideas and to promote a healthy discussion of the contents of the pieces of media content, the system also allows users to join discussion groups hosted by the system as well as to contact each other directly. Depending on the implementation, these discussion groups may be divided into specific topics or may be divided such that each piece of media content can have its own specific discussion group. Again, depending on the implementation, verification users may be provided with moderator duties and moderator status in such discussion groups.

As noted above, general users may transition to become verification users upon completion of one or more online courses or modules relating to online fact-checking. As noted above, these courses may be provided by the system. Depending on the implementation, the various courses maybe tiered such that the more courses or modules a user has completed, the more responsibility and access he or she may have in the system.

Figure 1:
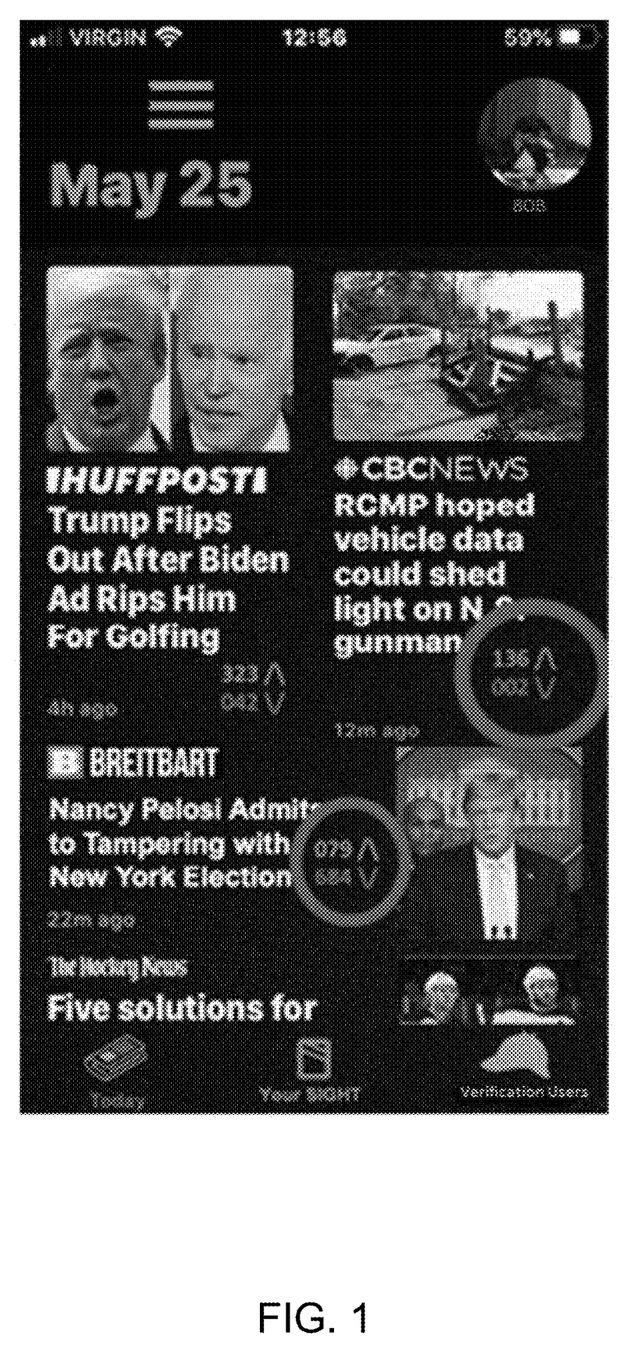
FIGS. 1 to 4 are screenshots of a user interface used in one implementation of the present invention.

Referring to FIG. 1, a screenshot of the interface used by most users in one implementation of the present invention is provided. As can be seen from FIG. 1, the truth ratings for two of the articles in the illustrated news feed are circled. From FIG. 1, the CBC news article has a truth rating of 136 while the Breitbart article has a truth rating of 79. Similarly, the HuffPost article has a higher truth rating than the CBC news article and is, therefore, more prominently displayed on the interface. Similarly, the Breitbart News article has a much lower truth rating than either the HuffPost article or the CBC news article and, as such, the Breitbart news article is not as prominently displayed on the interface. It should also be noted that the truth rating for the articles illustrated in FIG. 1 include not just the upvotes but also downvotes for each article. For the CBC news article, there are 136 upvotes while there are two downvotes. This means that 136 users consider the CBC news article to be truthful while 2 viewers consider the same article to be untruthful.

Figure 2:
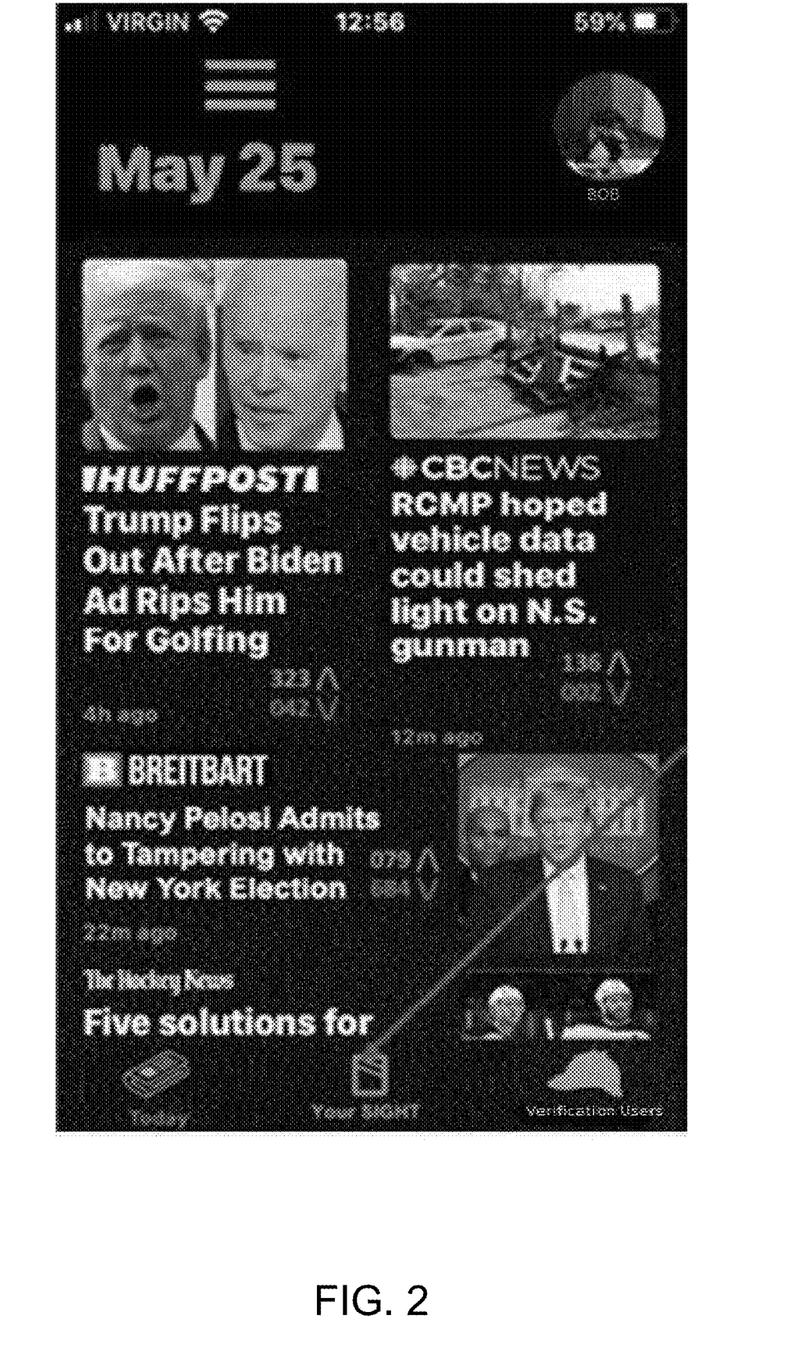

Referring to FIG. 2, the arrow points to an icon that, when activated, causes the system to only show the articles that are relevant to that individual user's interests. The user can configure his or her news feed according to his or her preferences.

Figure 3:
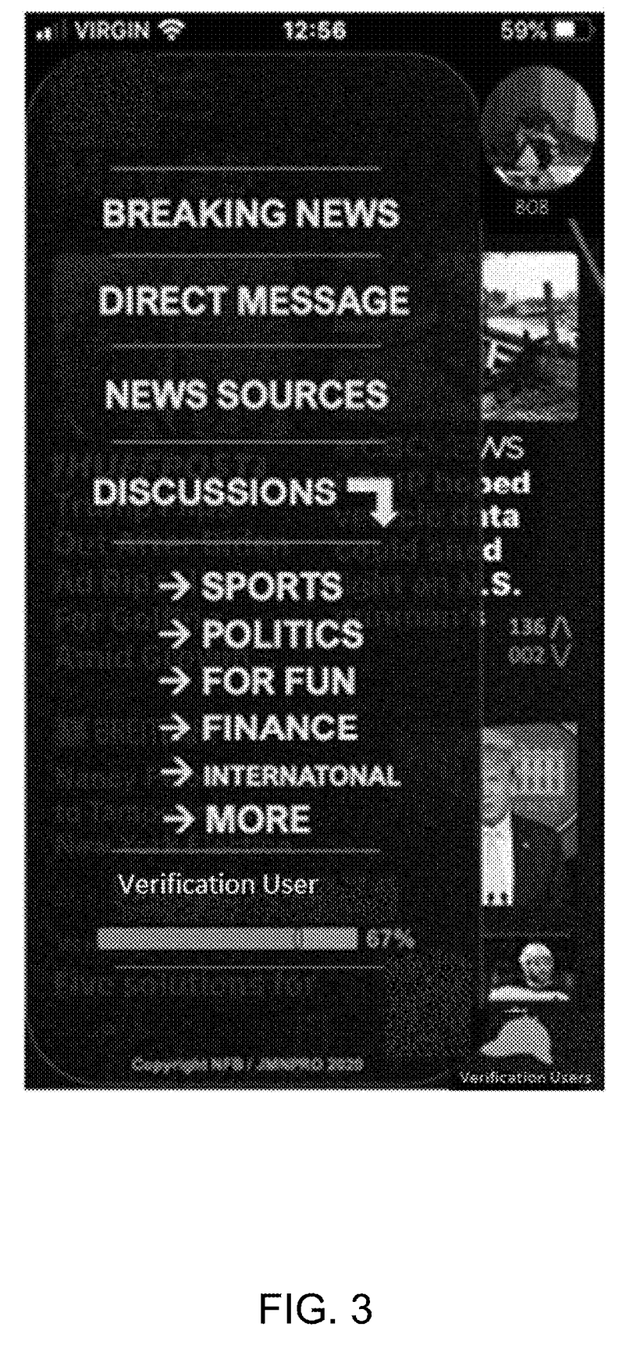

Referring to FIG. 3, a variant of the main user interface is illustrated. As can be seen, the interface provides navigation cues useful for navigating the system. A user can therefore access breaking news, direct messages between users, a listing of different news sources or organizations, as well as multiple discussion groups on various topics.

As noted above, the system allows users to directly message one another and these messages are accessed by each user by clicking on the Direct Messages tab as illustrated in FIG. 3. The News Sources tab shown in FIG. 3 can be used to access the various news organizations that submit or contribute articles or media pieces to the system. As well, the News Sources tab can be used by the user to directly view one or more pieces of media content directly at the website of the organization that submitted the media content.

Regarding the Discussions tab in FIG. 3, the main topics for discussions are provided in the user interface. As can be seen discussion topics range from Sports, Politics, Finance, as well as others. Further subdivisions of these topics are possible and maybe accessed by activating the relevant topic.

Also present in the user interface in FIG. 3 is an indication of the user's progress (a bar graph) in becoming a verification user. As can be seen, the term "Verification User" is used in the user interface to indicate a verification user. For the user using the interface in FIG. 3, that user is 67% done with the modules to become a full-fledged verification user. Should that user wish to continue his or her path to becoming a full-fledged verification user, that user simply has to activate the deerstalker icon on the interface to access more modules (and avail of more training) regarding online fact-checking.

Figure 4:
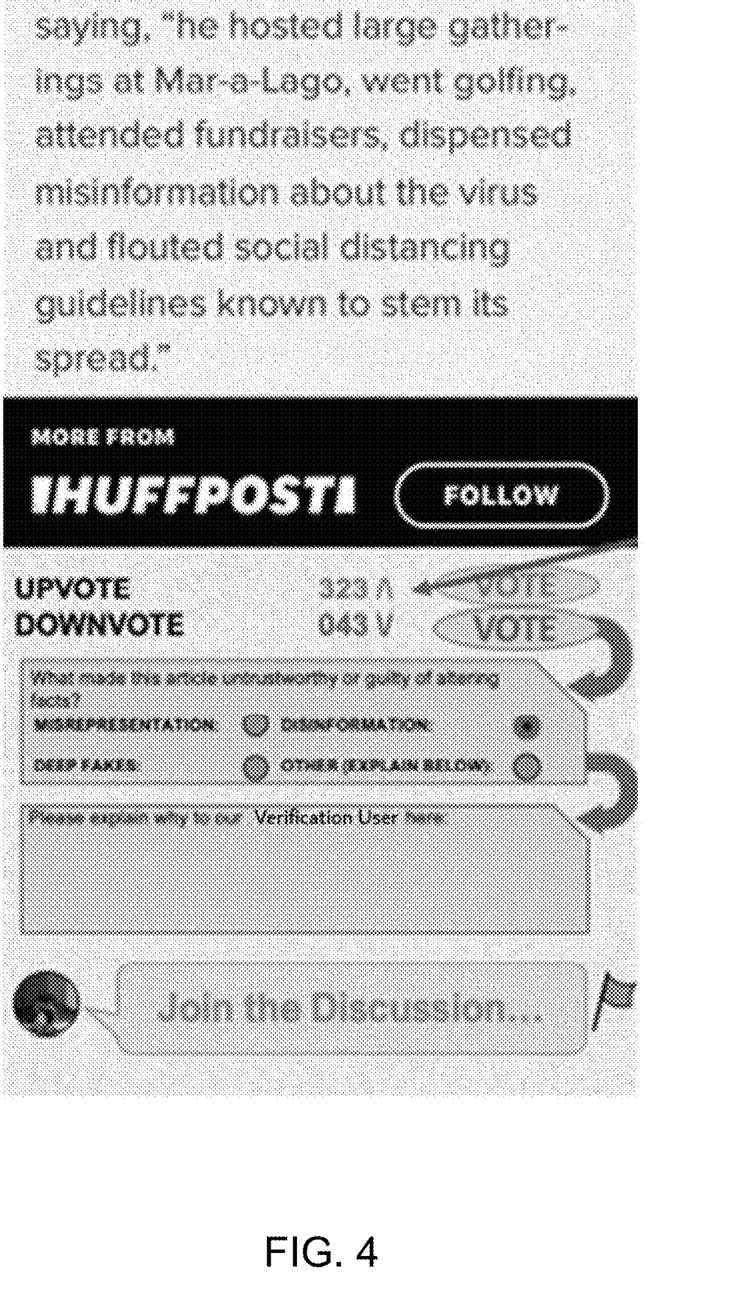

Referring to FIG. 4, illustrated is a user interface used for reading/viewing/consuming a piece of media content. As can be seen, the text of a news article is provided on the user interface along with the organization (HuffPost) that provided the piece of media content, as well as the truth rating for that piece of media content. For this specific news article, 323 users have considered this piece of media content to be truthful, while 43 users have considered this piece of media content to be untruthful or, at the very least, problematic. It should be clear that each user is only accorded a single vote for each piece of media content. Thus, each user can either upvote or downvote a specific piece of media content and that user's vote counts towards the aggregate for the truth rating for that piece of media content. Note that, if the user downvotes a specific piece of media content, that user is required to provide an explanation as to the downvote. In FIG. 4, it can be seen that a user who downvotes a piece of media content must indicate, out of four possible reasons, the reason for the downvote. In addition to indicating a category for the downvote, a user downvoting a piece of media content must also provide a free form explanation as to the downvote. These explanations for the down vote can be assessed and/or viewed by verification users. In some implementations, verification users, based on their assessment of the explanation, can negate a user's specific down vote.

It should be clear that the two-step report system shown in FIG. 4 for downvotes is designed to prevent users from downvoting articles without proper justification. As another feature of the system, reasons for the downvotes are anonymously made public such that all users of the system can read these reasons as well as the justification for the downvote. Comments by verification users regarding the down vote or regarding the veracity of the piece of media content are also made public and are associated with each piece of media content. This way, users can see why other users have downvoted a specific piece of media content as well as justifications by verification users as to why a piece of media content is truthful or untruthful. Users are, therefore, provided a more complete picture regarding the opinions as to the truthfulness or untruthfulness of a specific piece of media content. This more complete picture afforded to users is designed to provide users with more information such that they can formulate more informed opinions about not just media content but about the circumstances surrounding the media content.

Returning to FIG. 4, users are provided with the opportunity to join discussion groups regarding every piece of media content viewable through the system. In the Figure, it can be seen that an interface element, when activated, gives users a one-click access to the discussion groups for that specific piece of media content. To prevent harassment or abusive comments, users are also provided with a flag on the user interface for each piece of media content. By activating this flag, a user flags not only the offending comment but also the user leaving the comment. Verification users and/or moderators are then alerted as to the flags and can take appropriate action as necessary.

Regarding the training modules that are available to general users, as noted above, these are used to transition general users to verification users. Preferably, the training provided is modular with each module being quick, informative, and interactive. These modules can be completed at each user's pace. As noted above, the more modules a user completes, the more responsibilities and/or access that user has to the system.

For clarity, the term "media content" is to be taken to mean any piece of text, image, video, sound, or any document that is submitted to the system. The system can therefore be used to assess the truthfulness of media content such as images or video of unfolding news events, news articles, opinion pieces from journalists, academic articles, journal articles, papers, or any piece of media or multimedia content. Accordingly, the system may be used to curate academic articles or it may be used to peer review similar articles. As can be imagined, the system essentially crowdsources the assessment of media content. For this implementation of the invention, the assessment carried out relates to the truthfulness or veracity of the media content. However, the system may also be used to assess the artistic, literary, or academic qualities of the media content. While the present invention contemplates having the general public be able to access the system to thereby assess the veracity of the various pieces of media content, for implementations that require specific skills and/or experiences for the assessment of the media content, the system may be configured to only be accessible to specific individuals. As an example, if the system were configured to assess the artistic merit of artwork, the users would have to be artists or art critics or individuals who have an interest in or a connection to the art world or to the artistic community.

It should be noted that, in aspect of the present invention, the database operates as an indexed repository of the media content submitted/stored with the system. This allows users to more easily locate and view previous media content as well as any supporting documentation relating to that media content. This allows for verification users and system administrators to not only avail of previous submissions, previous media content, and whatever supporting documentation is associated with these pieces of media content. This also allows system administrators to roll back any changes there may have been to media content or media content user feedback in the event the feedback or the media content is deemed to be unacceptable and/or erroneous.

Figure 5:
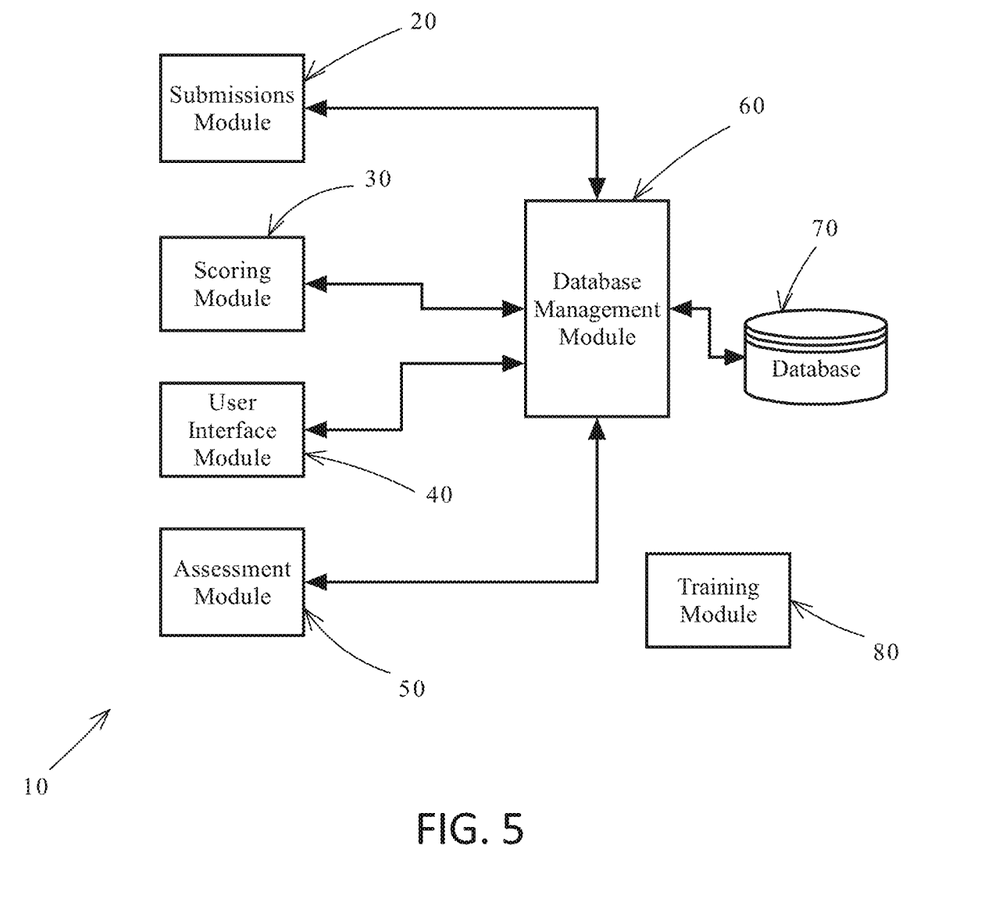
FIG. 5 is a block diagram of a system according to one aspect of the present invention.

To implement the various concepts and/or aspects of the present invention, a system akin to that illustrated in FIG. 5 may be used. The system illustrated in FIG. 5 may be embodied in a computer server or it may be embodied in multiple computer systems operating as a single logical server. The system operates to communicate with a user device to deliver the user interface and the media content to the users. As can be seen from the screenshots of FIGS. 1-4, the user device can be a mobile telephone or any other data processing device such as a computer, a tablet, or any other device.

The system 10 illustrated in FIG. 5 includes a submissions module 20, a scoring module 30, a user interface module 40, an assessment module 50, and a database management module 60. Also included in the system are a database 70 and a training module 80.

The submissions module 20 receives submissions from organizations and/or authors and ensures that the submissions are presented to the users while any supporting documentation is associated with the submission and are stored in the database 70. The supporting documentation and at least one copy of the submission passes through the database management module 60 prior to being stored in the database 70. The database management module 60 manages data accesses, data storage, and data retrievals concerning the database 70.

Once a submission has been presented to the users, any comments, feedback, votes, upvotes or downvotes by the users is passed to the scoring module and is associated with the specific submission. The scoring module calculates each submission's truth rating based on the received feedback from the users as well as the reputation scores for the associated organization and/or author for the submission. The scoring module 30 ensures that any changes in scores that are relevant to specific submission is reflected in each submission's truth rating as presented to users. As an example, changes to an organization's reputation score causes a recalculation of the truth rating for any and all media content that is associated with or has been sourced from that specific organization. To be able to do this, the scoring module continuously accesses the database management module to be kept abreast of the number of submissions from each organization as well as the assessment of the veracity for each submission as assessed by the verification users. It should be clear that any changes to the truth rating of media content is sent to the user interface module 40 so that users are provided with the most up-to-date truth rating for each piece of media content available.

Once the user interface module 40 receives updated truth ratings as well as copies of submissions, these pieces of data are presented to each and every user as necessary. Of course, to be able to execute these steps, the user interface module retrieves data from the database by way of the database management module 60 as necessary. It should also be clear that the user interface module may interact with other modules or have sub-modules that implement specific functionalities of the system. As an example, any direct messages between users may be entered through the user interface module and then routed through relevant modules so that the messages are received by the relevant users. Similarly, a submodule for implementing discussion groups may also be present and may be accessed by each user by way of the user interface module.

The assessment module 50 allows verification users to be presented with the necessary supporting documents that have been submitted with each submission. As well, the assessment module may be configured to allow verification users to leave comments and/or assessments for each submission. Some of these comments may be made public and be associated with the relevant submissions or they may be tagged such that only verification users are allowed to access them. As can be imagined, the assessment module 50 continuously accesses the database by way of the database management module 60 to retrieve and/or store supporting documentation, comments, messages, any other data necessary or requested by verification users to properly assess the veracity of submissions.

The training module 80 is used to provide training for general users seeking to become verification users. As noted above, the training is preferably modular, with each module being easily accessible do the general user. In one implementation, a general user's path to becoming a full-fledged verification user is phased. For this implementation, completion of each module provides the user with more responsibilities and more access to the system. Note, however, that moderator duties including moderation of discussion groups as well as moderation of general user comments on media content may not be accessed until a user has completed most, if not all, of the modules for online fact-checking. In some implementations, the modules and the training provided may go further than online fact-checking and may include training regarding moderation of discussion boards as well as management of digital media involving multiple users.

It should be clear that the training module may be implemented using multiple sub-modules, with each sub-module being tasked with providing specific training in one or more areas to each general user attempting to become a verification user. Depending on the implementation, the sub-modules may be periodically updated to improve and/or supplement the online fact-checking training provided to the users. Depending on the configuration of the system, qualified verification users may be required to periodically update their training by going through the newer modules as necessary. This ensures that the training of the verification users is up-to-date and that the skills of the verification users are constantly updated and relevant.

The training module may include submodules that aim to train a user in three distinct and independent but parallel areas. These areas relate to: site moderation, content provision, and content verification. When completed, a user should be qualified, within the system, as one or more of: a site moderator, a content provider, and a verification user.

The site moderator training will encompass general site training and will allow the user to operate administratively within the platform and react to situations as they arise. The training for this area will be modular in nature and will include general site administration, cultural sensitivity training, de-escalation training, and response training (response training will include training to deal with matters such as hate speech, personal/mental crisis etc.). Once completed, the trained user will be able to react appropriately in instances where users need to be blocked/removed and in instances where reviews of verification user complaints or suspension of verification user privileges are necessary.

The content provider training will be aimed at individuals looking to post media content on the site. The training will provide content providers with knowledge and techniques on how to provide content to the platform in a standardized, easily verifiable format. When completed, the training will allow content providers to gain verification user approval quickly and will train content providers on how to craft their content to be not only visible but also verifiable by verification users as soon as practicable. The content providers will be trained on how to cite their material and sources within the text or the media content (i.e., in a manner similar to academic papers etc.) to thereby ensure ease of verification by verification users. Such training will promote adherence to the system's formats and practices such that media content provided by content providers can be quickly and efficiently verified by verification users.

The training submodules for verification users are aimed at providing verification user training in three parallel areas: general training, technical training, and administrative training. Completion of all submodules in these areas is necessary before a user is given the status of a full fledged verification user (i.e., with full rights/privileges in the system).

The verification user general training provides basic level knowledge as to what disinformation is, how to recognize disinformation in its various forms, along with knowledge of standardized system terminology. The standardized system terminology will ensure that all content, comments, and/or communications originating from verification users are consistent in their terminology.

The verification user technical training will include training in publicly available tools and techniques to assist the verification user in validating submissions and will allow the verification user to provide clear, comprehensive evidence of disinformation if such is present in the submission. One possible submodule in this category would be a submodule relating to hash values. The hash submodule would expose the user being trained to the concept of hash values, examples of how hash values are used, as well as exposure to tools that allow for their use in content comparison. One or more examples, each of which can be provided in a step-by-step manner, of hash values are used can also be presented to the user.

The verification user administrative training will include training in how to properly articulate technical findings as well training that ensures that information found is gathered and represented in a system standardized package to allow users to more easily access and understand the findings. The training may include submodules on how to properly cite referenced materials as well as submodules dealing with respecting copyright as well as system standardized screen capture methods.

As the training is modular in nature, initial modules will assume little user knowledge and subsequence modules will build upon lessons learned in earlier materials. In one implementation, the submodules are presented such that a user is expected to progress through the submodules in a specific sequence. This ensures that later submodules can build upon and reference material from previous submodules in the sequence. Each submodule may be provided with an online testing capability such that concepts, skills, and ideas presented in the submodule are tested. Once the course has been completed, the verification user should have sufficient knowledge and skills to be an effective verification user in the system. While the course is not intended to produce disinformation experts, the course is meant to provide verification users with the appropriate knowledge and skills to identify, comment on, and flag disinformation that may be present in the media content submitted to the system.

For clarity, the truth rating of a piece of media content may change over time. Not only can the rating for the organization/individual that was the origin of the media content change over time but the rating of the media content from verification users or other users may also change over time. Thus, a verification user may change his or her opinion about the veracity of a piece of media content. If this occurs, the verification user changing his or her rating can add a comment that includes any new pieces of data that may have caused the change in opinion. As well, regular users who voted a piece of media content up or down may change their vote. While the weight of a few changed votes generally may not affect the overall view of a piece of media content, a new piece of data that may change the circumstances surrounding the piece of media content may, at times, change an audience's view of that media content. As an example, a photograph of a seemingly traumatic event may, initially, be viewed as being truthful or correct. However, if it later comes out that the photograph was completely staged and there is proof to support this view, the audience's view of this photograph may completely change.

As a check of sorts on the influence of verification users, a verification user can change his or her verification opinion about a specific piece of media content. When this occurs, the change is noted in the comments (e.g., be being "pinned" to the top of comments) and any supporting documentation relating to the change in opinion may be made available to all viewers. This allows viewers to be aware of changes and any data relevant to those changes. In addition to the pinned comment, an internal review of the verification user may be conducted for each changed opinion involving that verification user. An internal review may be conducted by a monitoring body and, if there are too many questionable or simply too many changes in opinion, the verification user may be sanctioned or disciplined. This may take the form of removal of the verification user from the system, requiring the verification user to retake the training modules, or some other suitable sanction.

It should be clear that many variants of the present invention are possible. As an example, the amount of scrutiny necessary to determine that a piece of media content is truthful or not may be dependent on the configuration of the system. In one example, the truth rating for each piece of media content is sufficient to provide users with an indication as to the veracity of the media content. However, in other implementations, a threshold of scrutiny may be necessary to categorize whether a piece of media content is being verified and/or true. As an example, if more than a threshold number of verification users indicate that a specific piece of media content is true or has been upvoted by the threshold number of verification users, that specific piece of media content may be tagged as being true. The tag may be used to signal to users that that piece of media content has survived scrutiny by the verification users.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A system for assessing media content, the system comprising:
   a media content database for storing media content;
   a training database for storing training module content, said training module content being related to online fact-checking;
   a user profile database for storing user profiles;
   a server for receiving said media content from users and for communicating with:
      said media content database;
      said training database;
      said user profile database; and
      at least one user device,
   said server comprising processing circuitry in communication with at least one memory unit, said at least one memory unit storing computer-executable instructions that, when implemented by said processing circuitry, implement:
      a user interface module for displaying said media content to at least one user by way of said user device;
      a scoring module that receives user input from said user interface module, said user input being a truth rating of said media content, and said scoring module calculating an overall truth rating of said media content based on said user input, wherein said scoring module continuously evaluates said overall truth rating of said media content; and
      a training interface presented to said at least one user by way of said at least one user device, said training interface retrieving said training module content from said training database to thereby provide training modules to said at least one user,
   wherein, after a specific user completes a predetermined number of training modules, said training interface directs said server to assign said specific user a status as a verification user and to record said status in said specific user's user profile, such that said verification users are created by and within the system, wherein said overall truth rating of said media content is exclusively based on:
  inputs received from verification users regarding said media content;
  inputs received from other users that are not designated as verification users, said inputs received from said other users having lower weight in a calculation of said overall truth rating than said inputs received from said verification users;
  an organization reputation score of an organization providing said media content, said organization reputation score being based on: a number of pieces of media content provided by said organization, a percentage of said pieces marked by verification users as being truthful, and a percentage of said pieces marked by verification users as being untruthful; and
  an author reputation score of an author, said author being associated with pieces of said media content in said system, said author reputation score being based exclusively on:
    a percentage of said pieces marked by verification users as being truthful, and
    a percentage of said pieces marked by verification users as being untruthful,
      such that said author reputation score is determined exclusively based on data contained within said system,
  such that said overall truth rating is determined exclusively based on data contained within said system,
wherein each piece of said media content submitted to the system is initially assigned a neutral truth rating and said neutral truth rating is incremented or decremented as said overall truth rating for said piece of said media content is calculated,
and wherein a display order of pieces of said media content in relation to other pieces of media content is adjusted based on overall truth ratings of said pieces of said media content, said display order being an order within a stream of content presented on said at least one user device by way of said user interface module.

2. The system according to claim 1, wherein said user interface module allows said at least one user to comment on said media content.

3. The system according to claim 2, wherein comments provided by said verification users are displayed above comments by other users.

4. The system according to claim 1, wherein a type of said media content displayed to said at least one user is customizable by said at least one user.

5. The system according to claim 1, wherein said media content is at least one of:
  text;
  image;
  video;
  sound;
  a news article;
  an opinion piece;
  an academic article
  a journal article;
  an academic paper;
  multimedia content.

6. The system according to claim 1, wherein media content submitted for assessment using said system is accompanied by supporting documentation.

7. The system according to claim 6, wherein said supporting documentation is used by said verification users to assess a truthfulness of said media content.

8. The system according to claim 1, wherein said at least one user accesses at least one discussion group regarding said media content using said interface.

* * * * *

UNITED STATES PATENT AND TRADEMARK OFFICE
CERTIFICATE OF CORRECTION

PATENT NO. : 12,306,889 B2
APPLICATION NO. : 17/449614
DATED : May 20, 2025
INVENTOR(S) : Morgan Bayliss Page 1 of 1

It is certified that error appears in the above-identified patent and that said Letters Patent is hereby corrected as shown below:

In the Specification
- Column 2, Line 38: change "are" to --is--.
- Column 2, Line 45: change "media content" to --media content's--.
- Column 3, Line 61: change "part" to --past--.
- Column 4, Line 58: change "maybe" to --may be--.
- Column 5, Line 11: change "maybe" to --may be--.
- Column 5, Line 56: change "seen" to --seen,--.
- Column 5, Line 58: change "maybe" to --may be--.
- Column 7, Line 29: change "in aspect" to --in an aspect--.
- Column 8, Line 3: change "is passed to the scoring module and is associated" to --are passed to the scoring module and are associated--.
- Column 8, Line 9: change "relevant to specific submission is" to --relevant to the specific submission are--.
- Column 8, Line 21: change "is" to --are--.
- Column 8, Line 57: change "do" to --to--.
- Column 10, Line 9: change "of hash values" to --of how hash values--.
- Column 10, Line 13: change "well training" to --well as training--.
- Column 10, Line 21: change "subsequence" to --subsequent--.
- Column 10, Line 62: change "be" to --by--.

In the Claims
- Claim 5, Line 9: change "an academic article" to --an academic article;--.
- Claim 5, Line 11: change "an academic paper;" to --an academic paper; and--.

Signed and Sealed this
Eighteenth Day of November, 2025

John A. Squires
*Director of the United States Patent and Trademark Office*